United States Patent [19]

Meyer

[11] Patent Number: 5,440,457
[45] Date of Patent: Aug. 8, 1995

[54] VENTILATING MEANS FOR SPOTLIGHTS ON AUTOMOTIVE VEHICLES

[75] Inventor: Bruce A. Meyer, Richmond, Tex.

[73] Assignee: Linear Solutions, Inc., Richmond, Tex.

[21] Appl. No.: 315,550

[22] Filed: Sep. 30, 1994

[51] Int. Cl.⁶ ............................ F21M 3/00; F21V 29/00
[52] U.S. Cl. .................................. 362/66; 362/74; 362/294
[58] Field of Search .................. 362/74, 285, 294, 373, 362/66

[56] References Cited

U.S. PATENT DOCUMENTS

| | | | |
|---|---|---|---|
| 4,630,029 | 12/1986 | Hayward | 362/74 |
| 4,707,014 | 11/1987 | Rich | 362/74 |
| 4,937,710 | 6/1990 | Hurley et al. | 362/294 |
| 5,091,828 | 2/1992 | Jincks et al. | 362/74 |
| 5,217,291 | 6/1993 | Meyer | 362/66 |
| 5,251,111 | 10/1993 | Nagengast et al. | 362/294 |
| 5,367,438 | 11/1994 | Deslandres | 362/294 |

Primary Examiner—Richard R. Cole
Attorney, Agent, or Firm—Bush, Moseley, Riddle & Jackson

[57] ABSTRACT

A spotlight assembly (10) mounted on the roof (R) of an automotive vehicle is manually actuated from a handle (28) to direct a light beam from a lamp unit or assembly (16) in a desired direction. Lamp unit (16) has a generally air tight space formed between a transparent lens (62) and a reflector (40). An inlet opening (63) is provided in a gap in a gasket (58) between the reflector (40) and lens (62) to permit air to enter the interior space. A discharge opening (65) is provided in the bottom of each bowl portion (46) of the reflector (40) to permit the discharge of air from the inner space of the lamp unit (16). A baffle attachment (64) is provided beneath each discharge opening (65) when the lamp unit (16) is in a retracted position as shown in FIG. 5. Baffle attachment (64) has a pair of vanes or baffles (70) which converge in a rearward direction toward the discharge opening (65) to create a venturi effect. During travel of the automotive vehicle, air passing through the baffle attachment (64) crates a suction at discharge opening (65) to draw moisture and air from the interior of the lamp unit (16). Air pressure within the interior of the lamp unit (16) is equalized as the lamps (52) heat and cool during on/off cycles of normal use.

12 Claims, 3 Drawing Sheets

5,440,457

VENTILATING MEANS FOR SPOTLIGHTS ON AUTOMOTIVE VEHICLES

BACKGROUND OF THE INVENTION

1. Field of the Invention

This invention relates to a spotlight assembly mounted on the roof of an automotive vehicle, and more particularly to means for ventilating the interior of the lamp unit of the spotlight assembly.

2. Prior Art

U.S. Pat. No. 5,217,291 dated Jun. 8, 1993 is directed to a hand operated spotlight assembly mounted on the roof of an automotive vehicle and having a lamp unit mounted for movement between an inoperable retracted position and an erect operable position. A handle inside the vehicle adjacent the roof is gripped manually for pivoting and rotating the lamp unit to a desired position of the light beam from the lamp unit. The lamp unit is mounted for unlimited rotational movement and for tilting pivotal movement in a generally vertical plane. The lamp unit in a retracted inoperable position faces in an upward direction to direct a light beam in a generally vertical direction.

Automotive auxiliary light systems fall into two categories, one category being sealed-beam lamps and the other category being those which are not sealed. The primary difference between the two is that sealed beam lamps are manufactured and sold as a complete assembly including lens, reflector, and light generating lamp element sealed with a vacuum or specific gases. Sealed beam lamps are discarded and replaced in their entirety if any component therein fails. Non-sealed beam lamps incorporate light generating elements in compact glass envelopes that contain the necessary gases essential to high levels of light output and extended operating life. The lens and reflective walls of the lamp are separate parts of the assembly. The typical point of failure in any lamp is the light generating element or bulb. Non-sealed beam lamps allow the user to access and replace the light element or bulb independently without having to discard and replace the reflector, lens, etc. An additional advantage of non-sealed beam lamps is that lamp designers are allowed much more freedom of design for specific applications.

Due to the extreme variance in ambient temperatures surrounding the lamp to the heat levels achieved within the lamp during extended periods of operation, non-sealed beam lamps must be vented so that pressure inside the lamp can be equalized with outside pressure. While a very small opening is adequate to equalize this pressure, moisture vapor is inevitably drawn into the lamp vent with the air taken into the lamp as the lamp cools after operation. This moisture condenses on internal parts of the lamp once such pans have cooled. This moisture can be detrimental to the performance of the lamp assembly over a period of time.

It is the object of this invention to provide a non-sealed beam lamp unit that uses air flow produced by vehicle motion to ventilate the interior of the lamp unit and to actively remove moisture from the interior of the lamp unit.

SUMMARY OF THE INVENTION

The present invention is directed particularly to a ventilation system for a non-sealed beam lamp unit for a spotlight assembly mounted on the roof of an automotive vehicle. The lamps or bulbs heat and cool during on/off cycles of normal use and it is necessary to have a vent so that air pressure within the interior of the lamp unit can be equalized during cycles of normal use. The lamp unit includes an inlet opening of a relatively small size to permit the entry of air within the substantially air tight interior space between a transparent lens and reflector for the bulbs or lamps. The lamp unit preferably includes two spaced lamps or bulbs and a discharge opening of a relatively small size is provided through the lamp body adjacent each of the bulbs. Thus, except for the inlet opening and the discharge opening, the interior space for the lamps is air tight.

An air flow baffle device or attachment is positioned on the lamp body adjacent each of the discharge openings. The baffle attachment includes a pair of vanes which converge in a rearward direction beneath an associated discharge opening and a lower cover member between the vanes directs the flow of air between the converging vanes to create a venturi effect which produces a suction at the discharge opening particularly upon travel of the automotive vehicle in a forward direction. The cover member also provides protection for the discharge opening so that road spray, rain, and car washes do not enter the interior space of the lamp unit through the discharge opening. The baffle attachment in the retracted position of the lamp unit is positioned on the lower surface of the body for the lamp unit, and air enters a front entrance opening for the baffle device between the converging vanes. The reflector or outer body of the lamp unit is of a parabolic shape and converges toward the lower cover member of the baffle device at the discharge opening.

In the retracted position of the lamp unit, the reflector is on the bottom of the lamp unit with an arcuate inner surface formed by the parabolic shape. As water vapors condense on the various components of the lamp unit, water droplets are formed and fall on the arcuate lower reflector surface for flow to the discharge openings at the lower bowl-shaped portions of the reflector. While such moisture will be drawn out through the discharge openings, surface tension between the water droplets and contacting surfaces will retain a portion of the water or moisture. The suction generated by the venturi effect at the discharge openings particularly upon travel of the vehicle will actively draw any remaining water from the discharge openings. Also, air is actively circulated from the inlet opening through the interior of the lamp unit and out the discharge opening. Thus, moisture that may have accumulated in the lamp unit through condensation or minor leakage is evaporated and removed at the discharge opening.

Other features, advantages, and objects of the invention will become more apparent after referring to the following specification and drawings.

DESCRIPTION OF THE INVENTION

Figure 1:
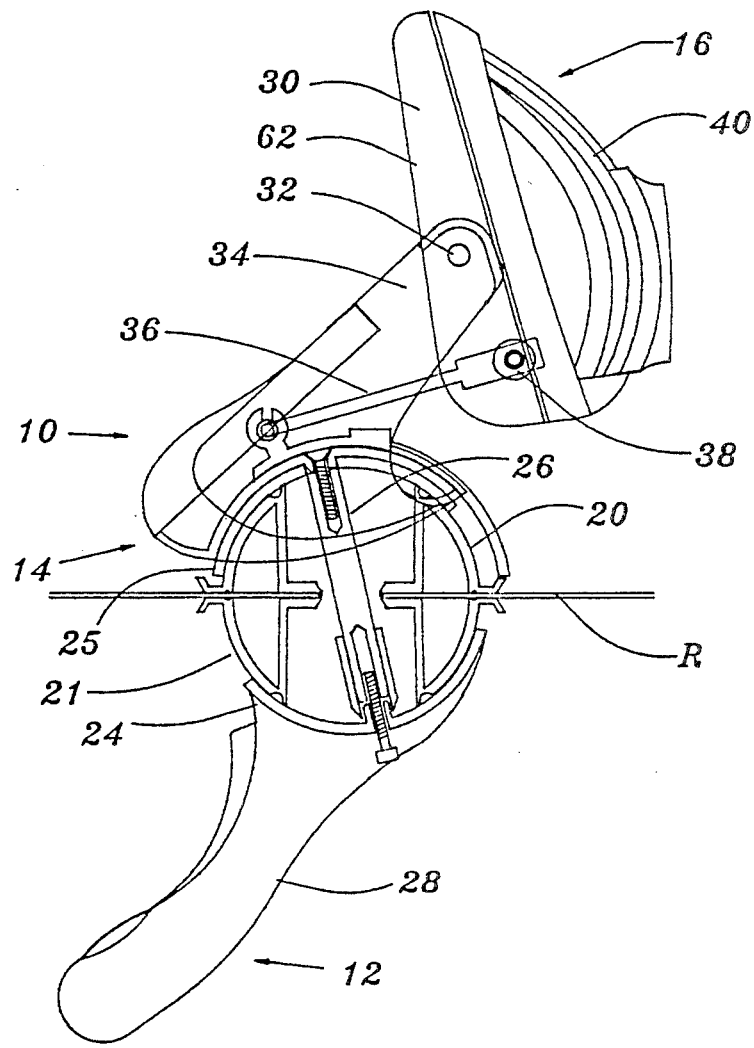
FIG. 1 is a side elevation of the spotlight assembly comprising the present invention with the lamp unit shown in an erect operable position on the roof of an automobile vehicle.
Figure 2:
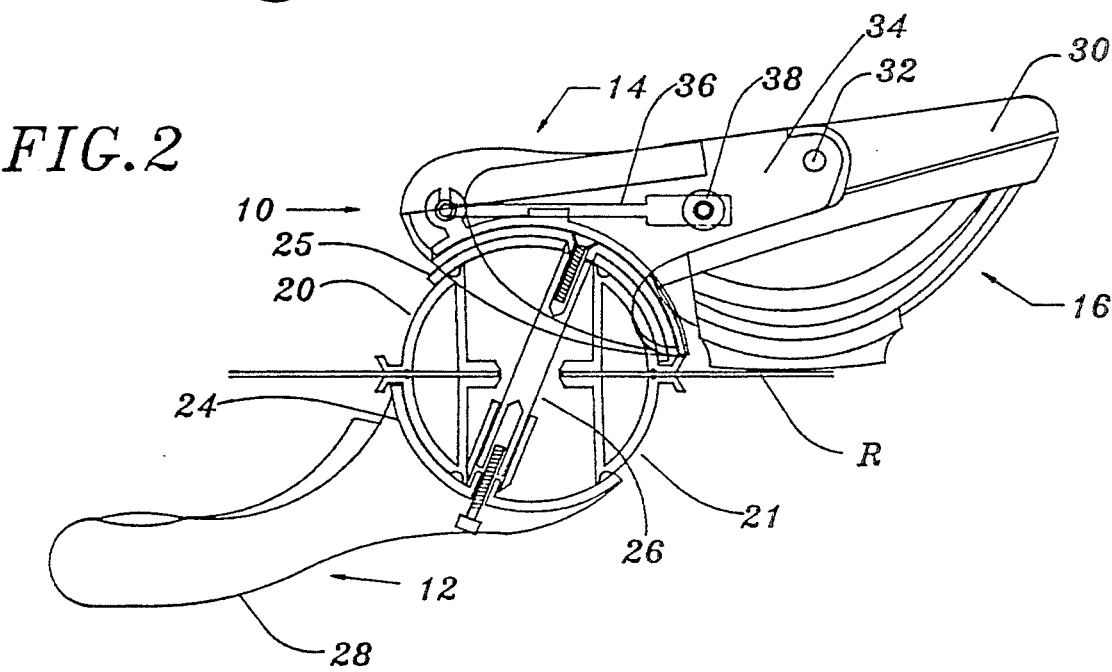
FIG. 2 is a side elevation of the spotlight assembly of FIG. 1 but showing the lamp unit in a retracted position facing in a generally vertical direction.

Referring to the drawings for a better understanding of this invention and more particularly to FIGS. 1 and 2, a spotlight assembly is shown generally at 10 mounted on the roof R of an automotive vehicle. Spotlight assembly 10 includes an inner movable frame 12 on the inner side of roof R and an outer movable frame 14 on the upper or outer side of roof R. A lamp unit or assembly generally indicated at 16 is mounted on outer movable frame 14 for tilting and rotative movements as will be explained further.

A pair of fixed hemispherical mounting members 20 and 21 are secured to respective outer and inner sides of roof R. Inner movable frame 12 has a concave bearing member 24 mounted on inner hemispherical member 21 for rotative and tilting movements. Outer movable frame 14 has a concave bearing member 25 mounted on outer hemispherical member 20 for rotative and tilting movements. A shaft or rod 26 extends through an opening in roof R and connects inner movable frame 12 to outer movable frame 14. A manually actuated handle 28 is secured to concave bearing member 24 of inner movable frame 12 to position outer frame 14 and lamp unit 16 at a desired position. Handle 28 is gripped manually by an operator of spotlight assembly 10.

Lamp unit 16 has a lens holder or retaining frame 30 including opposed pivotal connections 32 for pivotal mounting of lamp unit 16 between arms or side members 34 of outer movable frame 14. A generally U-shaped link 36 carried by outer movable frame 14 is pivotally mounted at its ends to opposed sides of lens holder 30 at 38 for positioning lamp unit 16 at a desired tilted relationship to outer frame 14. Lamp unit 16 may be rotated 360 degrees about an entire circle and may be tilted in a generally vertical plane around 130 degrees. For further details of spotlight assembly 10 reference is made to aforementioned U.S. Pat. No. 5,217,291 dated Jun. 8, 1993, the entire disclosure of which is incorporated by this reference.

Figure 3:
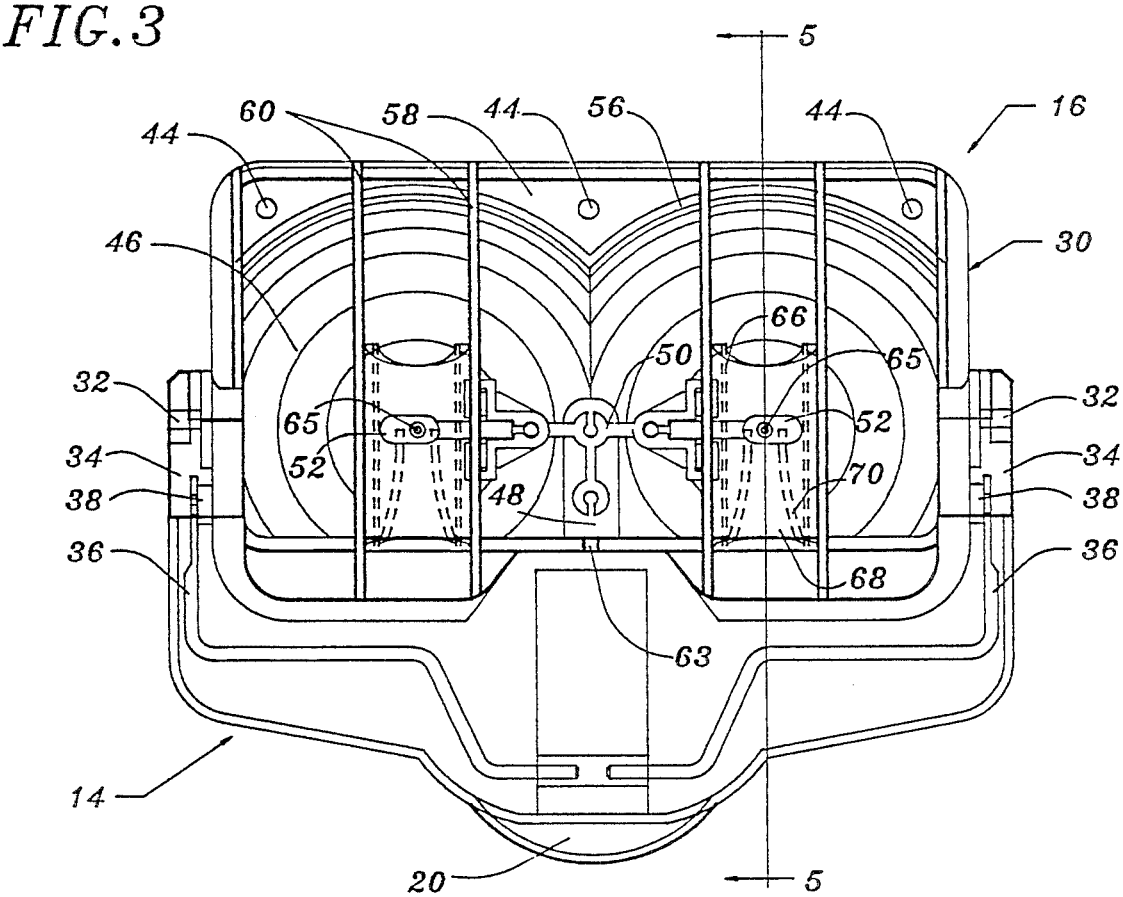
FIG. 3 is a top plan of the spotlight assembly of FIGS. 1 and 2 in a retracted position on the upper surface of the roof.
Figure 4:
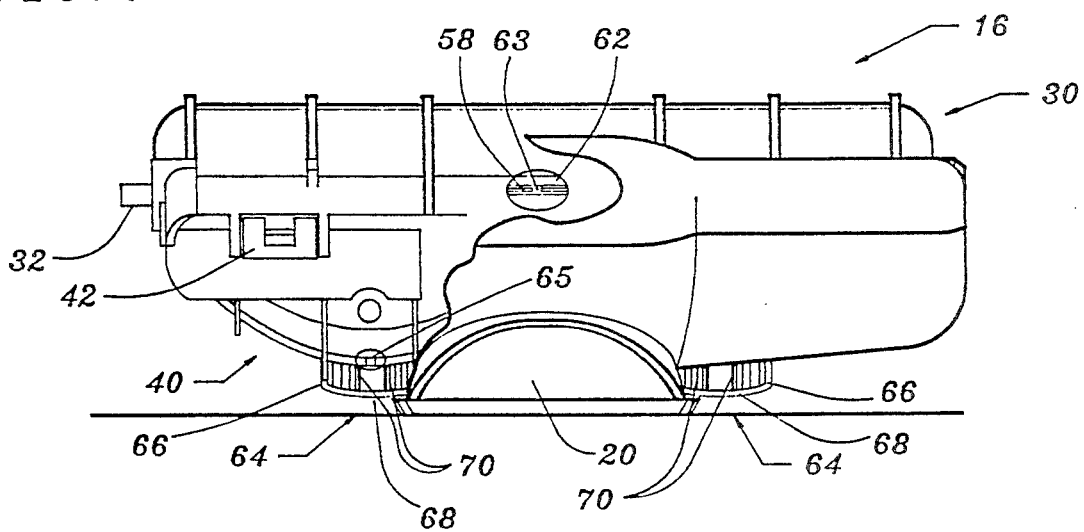
FIG. 4 is a front elevation of the spotlight assembly of FIG. 3.
Figure 5:
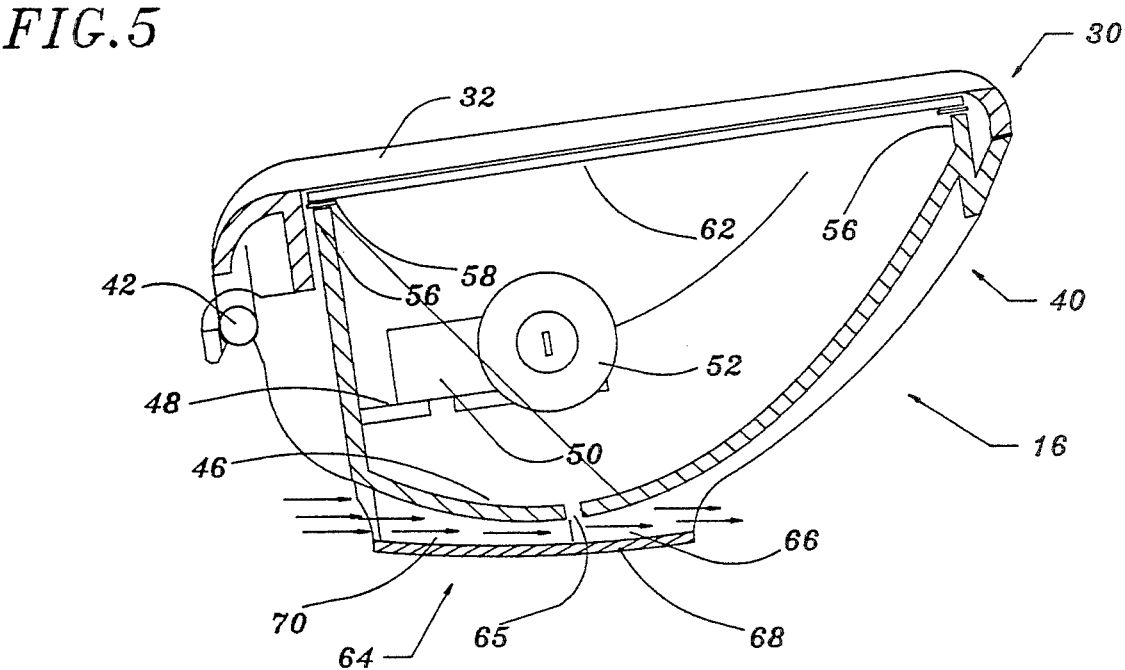
FIG. 5 is a section taken generally along line 5—5 of FIG. 3.

Referring now more particularly to FIGS. 3-5 in which lamp unit 16 is shown more fully, a parabolic reflector is shown generally at 40 having a pair of hinges 42 connecting reflector 40 to lens retaining frame 30 for relative pivotal movement. Removable fasteners 44 secure reflector 40 to retainer frame 30. Reflector 40 has a pair of bowl shaped portions 46. A planar mounting surface 48 is formed between bowl shaped portions 46 and a bulb carrier 50 is secured thereto by suitable fasteners. A pair of bulbs 52, preferably halogen bulbs, are mounted on bulb carrier 50. Suitable focusing means (not shown) may be provided for optimizing the converging of light beams from bulbs 52. To replace bulbs 52, fasteners 44 are removed and reflector 40 is pivoted about hinges 42 relative to retainer frame 30 for opening of lamp unit 16. Thus, bulbs 52 in bulb carriers 50 may be replaced if desired.

A continuous rim 56 is provided about the entire perimeter of reflector 40 and a gasket 58 is positioned on rim 56 between reflector 40 and a transparent lens 62. Retaining strips 60 extend over transparent lens 62. Transparent lens 62 is positioned against gasket 58 and held by frame 30 in tight sealing relation with gasket 58 to provide a generally air tight space between lens 62 and reflector 40. To permit air to enter the interior space between lens 62 and reflector 40, gasket 58 has a gap forming an inlet opening 63 at ring 56 which faces in the direction of travel of the vehicle.

As shown particularly in FIGS. 3-5 with lamp unit 16 in a retracted position, an outlet or discharge opening 65 is provided in the lowest portion of each bowl-shaped portion 46. Mounted beneath each discharge opening 65 on reflector 40 is a baffle device or attachment generally indicated at 64. Baffle attachment 64 has a pair of side walls 66 connected to a lower cover member or wall 68. A pair of spaced vanes or baffles 70 are secured to lower cover member 68 and converge rearwardly toward discharge opening 65. The space between baffles 70 from the front end of baffle attachment 64 to opening 65 decreases laterally as well as vertically as shown particularly in FIG. 5 thereby to create a venturi effect at discharge opening 65. Thus, a suction is provided at discharge opening 65 from air passing from the front end of baffle attachment 64 particularly upon travel of the automotive vehicle when lamp unit 30 is in a retracted position. Any water vapors condensing on the components of lamp unit 16 within the enclosed space defined between transparent lens 62 and reflector 40 will fall to the lower portion of the inner reflector surface adjacent discharge opening 56 in the retracted position. While some moisture will drain by gravity through discharge opening 65, surface tension between the water droplets and the adjacent contacting surface will retain a portion of the water or moisture. However, the venturi effect defined by converging baffles 70 and lower wall 68 will generate a suction at discharge opening 65 particularly upon travel of the vehicle and will actively draw any water from discharge opening 65. Also, air is being drawn in from inlet opening 63 in gasket 58 to provide a ventilation of the interior of lamp unit 30 so that any accumulated moisture is evaporated and removed at discharge opening 65. Lower wall 68 also acts to prevent foreign matter, such as snow, ice, or other debris from contaminating discharge opening 65. As shown particularly in FIG. 4, baffle attachments 64 are spaced laterally of mounting member 20 so that mounting member 20 does not block the flow of air to baffle attachments 64 during travel of the vehicle. Lamp unit 16 extends laterally beyond mounting member 20. Openings 63 and 65 are preferably around 0.100 inch in diameter or width but may vary from around 0.050 to around 0.250 inch in diameter.

While inlet opening 63 and discharge openings 65 are shown in specific locations, it is to be understood that the inlet opening and discharge opening could be provided at other locations in the lamp unit and operate in a satisfactory manner for ventilation of the lamp unit. While lamp unit 16 is particularly adapted for use when pivoted in a retracted position with the light beams directed in a generally vertical direction for ventilation of the interior of the lamp unit during travel of the automotive vehicle, it is understood that the lamp unit may be ventilated without travel of the automotive vehicle.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A spotlight assembly adapted to fit on a roof of an automotive vehicle for directing a light beam in a desired direction; said lamp assembly comprising:

a base secured to said roof;

a lamp assembly mounted on said base for pivotal movement between predetermined positions; said lamp assembly including a body having a transparent lens adjacent a front side and a reflector adjacent an opposed rear side thereof to define a generally air tight inner space therebetween;

a bulb mounted within said body in said space between said transparent lens and said reflector;

an inlet opening of a predetermined relatively small size in said body in fluid communication with said inner space to permit the entry of air within said space particularly upon movement of said vehicle in a forward direction;

an outlet opening of a predetermined relatively small size in said body in fluid communication with said inner space and with atmosphere; and means on said body for directing air flow past said outlet opening to provide a suction thereat for the discharge of air from said inner space particularly upon movement of said vehicle in a forward direction.

2. A spotlight assembly as set forth in claim 1 wherein said means for directing air flow comprises a pair of vanes on opposite sides of said outlet opening converging toward each other in a rearward direction relative to the travel of said vehicle.

3. A spotlight assembly as set forth in claim 2 wherein a lower cover extends between said baffles for confining the flow of air between said baffles toward said outlet opening.

4. A spotlight assembly as set forth in claim 1 wherein said reflector includes a pair of bowl-shaped portions for receiving a pair of laterally spaced bulbs; and an outlet opening is in each of said bowl-shaped portions adjacent said bulbs.

5. A spotlight assembly as set forth in claim 1 wherein said body includes a retaining frame for said lens and said reflector includes mounting means for said bulbs; and removable fasteners secure said reflector to said retaining frame to permit access to the interior of said reflector for replacement of said bulbs.

6. A spotlight assembly as set forth in claim 1 wherein said lamp assembly extends laterally beyond opposite sides of said base; and said outlet opening is positioned laterally outwardly of said base to permit an unobstructed flow of air past the outlet opening during movement of the vehicle in a forward direction.

7. A spotlight assembly as set forth in claim 1 wherein manual actuating means for said lamp assembly are positioned within the interior of said automotive vehicle and operatively connected to said lamp assembly for pivoting of said lamp assembly in a generally vertical plane and for rotation of said lamp assembly about a longitudinal axis.

8. A spotlight assembly as set forth in claim 7 wherein said base comprises a pair of hemispherical members fixed to opposite sides of the roof of said vehicle to define upper and lower hemispherical members; and said lamp assembly includes a lower concave bearing member fitting on said upper hemispherical member for relative movement to form a ball and socket joint.

9. A spotlight assembly as set forth in claim 8 wherein:

means mount said lamp assembly on said base for pivotal movement between a retracted position in which the lamp assembly is pivoted downwardly adjacent the roof with the light beam directed upwardly, and an erect position in which tile light beam is directed in a generally horizontal direction;

said means for directing air flow comprising a pair of vanes converging toward each other on opposed sides of said discharge opening to provide a venturi effect for exerting a suction at said discharge opening.

10. A hand operated spotlight assembly adapted to be mounted on a roof of an automotive vehicle for directing a light beam in a desired direction; said spotlight assembly comprising:

a pair of fixed mounting members of a hemispherical shape secured to opposed sides of the roof to define upper and lower mounting members;

a lamp assembly of a generally rectangular shape mounted on said upper hemispherical member for pivotal movement between predetermined positions; said lamp assembly including a body having a transparent lens adjacent a front side and a reflector adjacent an opposed rear side thereof to define a generally air tight space therebetween;

a pair of laterally spaced bulbs mounted within said space between said transparent lens and said reflector;

an inlet opening of a predetermined relatively small size in said body in fluid communication with said inner space to permit the entry of air within said space particularly upon movement of said vehicle in a forward direction;

an outlet opening of a predetermined relatively small size adjacent each of said bulbs in fluid communication with said inner space and with atmosphere; and means on said body for directing air flow past each of said outlet openings to provide a suction thereat for the discharge of air and any entrained moisture from said inner space particularly upon movement of said vehicle in a forward direction.

11. A hand operated spotlight as set forth in claim 10 wherein said means for directing air flow comprises a pair of vanes for each outlet opening converging toward each other in a rearward direction relative to the travel of said vehicle.

12. A hand operated spotlight as set forth in claim 10 wherein manual actuating means for said spotlight assembly are positioned within the interior of said automotive vehicle and operatively connected to said lamp assembly for pivoting of said lamp assembly in a generally vertical plane between retracted and erect positions, and for rotation of said lamp assembly about a longitudinal axis.

* * * * *